United States Patent Office 3,131,509
Patented May 5, 1964

3,131,509
COMPOSITIONS AND METHODS FOR REDUCING HERBICIDAL INJURY
Otto L. Hoffmann, Shawnee, Kans., assignor to Spencer Chemical Company, Kansas City, Mo., a corporation of Missouri
No Drawing. Filed May 8, 1961, Ser. No. 108,294
16 Claims. (Cl. 47—1)

This invention relates to novel compositions and methods for reducing or nullifying injury to young crop plants by selective herbicides. More specifically, this invention relates to novel compositions and methods for reducing injury to young crop plants by selective herbicides, such as the carbamate growth regulants, which comprises treating the seed of the crop plant prior to planting with an antagonistic agent for the selective herbicide.

The selective herbicides such as the 4-halo-2-butynyl N-(3-halophenyl)carbamates, isopropyl N-phenylcarbamate, isopropyl N-(3-chlorophenyl)carbamate, 2,3-dichloroallyl N-propylthiolcarbamate, 2(2,4-dichlorophenoxycarbonyl)-1-methylethyl N-(3-chlorophenyl)carbamate, and n-propyl N,N-dipropylthiolcarbamate are very useful for controlling certain weeds in the presence of other growing plants. However, many of these herbicides injure the crop plant, slowing its growth and development at application rates necessary to stunt or kill the weeds. This injury is characterized by growth inhibition of the leaf blade which may be complete at high rates or partial at lower rates. Higher concentrations of the herbicide in addition to causing leaf injury will also delay or prevent growth of the apical meristems (growing points). The gross morphological symptom of this effect is the absence of new leaves. Still higher rates kill the apical meristem and delay the development of tillers (axillary buds). In the case of the carbamate selective herbicides, the leaf color of inhibited plants changes from a yellow-green to a blue-green color. Obviously, there is a need for a method of reducing or nullifying the injury of the crop plant by the selective herbicide while not affecting the herbicidal action on the weed to be controlled.

There is provided by this invention a novel method of reducing or nullifying injury to the desired crop plant by selective herbicides which does not interfere with the herbicidal action on the weed to be controlled. There are also provided novel compositions for treating crop seed to reduce or nullify injury by selective herbicides, as well as seed treated with said compositions.

The method provided by this invention consists of treating the crop seed prior to planting with an antagonistic agent that will counteract and thereby nullify or reduce injury to the young crop plant resulting from the subsequent application of a selective herbicide. The only time in crop production when the crop is separate from the weeds is before the crop seed is sown. Thus, by treating the crop seed with an antagonistic agent to prevent subsequent injury by a selective herbicide, the crop is protected; yet, the weeds receive the full herbicidal action of the selective herbicide. This method results in increased efficiency of the selective herbicide in controlling weeds in the crop. Also, by providing protection from injury to the desired crop by the herbicide, the vigor of the crop plant is increased, thereby giving increased yields earlier in the growing season.

"Antagonistic agents" for the purpose of this invention are defined as compounds which systemically counteract the herbicidal action of selective herbicides, thereby reducing or nullifying injury to the plant, yet, which exhibit little or no toxicity to the crop seed at effective rates of application. The antagonistic agent must also be stable to decomposition by the plant or by the soil organisms and must be absorbed by the plant through its roots in order to be available at the injury sites of the plant to counteract injury by the selective herbicide.

I have found that the hormone-type growth regulants are especially useful as antagonistic agents for use in this invention. Hormone-type growth regulants are compounds which produce formative effects or distortion of the normal characteristics of a plant. A typical formative effect occurring on grasses is called "onion leaf" in which the leaf blade edges do not separate in the development of the plant, and the leaf takes on the appearance of onion leaves. In broad leaf plants, formative effects such as "strap shaped," "willow shaped," broadened or thickened leaves occur. Of course, useful hormone-type growth regulants must also be essentially non-toxic to the crop seed at application rates necessary for counteracting injury by the subsequent application of the selective herbicide.

Especially useful antagonistic agents are the halogenated 2-hydroxyiminoacetanilides such as 4'-chloro-2-hydroxyimino-acetanilide, 3',4'-dichloro-2-hydroxyiminoacetanilide and 3'-chloro-2-hydroxyiminoacetanilide, the arylsulfonamides such as N-methyl-2,5-dichlorobenzenesulfonamide, N-methyl-3,4-dichlorobenzenesulfonamide and para-toluenesulfonamide, the halogenated 5-arylhydantoins such as 5-(3,4-dichlorophenyl)hydantoin, 5-(2,4-dichlorophenyl)hydantoin, 5 - (2 - chlorophenyl)hydantoin and 5-(4-chlorophenyl)hydantoin, the amine salts of N-substituted dithiocarbamates such as isopropylammonium N-isopropyldithiocarbamate, piperidinium piperidine-1-carbodithioate, furfurylammonium N-furfuryldithiocarbamate and isobutylammonium N-isobutyldithiocarbamate, the halogenated isatins and isatin oximes such as 4,7-dichloroisatin,
6-chloroisatin,
7-chloroisatin,
4,5-dichloroisatin,
6-chloroisatin-3-oxime and
5-chloroisatin-3- oxime, and the compounds
2,4-dichloro-9-xanthenone,
N-(3-chlorophenyl)propionamide,
2-cyano-3-(2,4-dichlorophenyl)propenoic acid,
2,4,6-trichlorophenoxyacetic acid,
N-(3-chlorophenyl)-1,2,3,6-tetrahydrophthalimide,
N,N'-bis(3,4-dichlorobenzylidene)-3,4-dichlorobenzylidene diamine,
N-(3-chlorophenyl)pyruvamide,
1,3-bis(3-chloro-4-methylphenyl)thiourea,
N-(3-chlorophenyl)tribromoacetamide,
ethyl α,β-dibromocinnamate,
α-chloro-α-(2,4-dichlorophenyl)acetic acid,
2-benzothiazolyl N-(3-chlorophenyl)thiolcarbamate,
cinnamohydroxamic acid,
ethyl naphtholate,
n-heptaldehyde,
N-(3-chlorophenyl)-4-amino-2-hydroxybenzamide,
3-bromopropyl N-(4-bromophenyl)carbamate,
phthalyl hydrazide,
amalic acid,
hydrocinnamic acid,
2-bromoethyl N-(4-bromophenyl carbamate),
α-hydrazoisobutyric acid,
dibenzoylmethane,
N-(4-chlorophenyl) α-chloropropionamide,
β-morpholino-para-bromopropiophenone hydrochloride,
ethyl 3-(2,5-dichlorophenyl)carbazate,
α-(4-chlorophenyl)-α-methyl-2-pyridinemethanol hydrochloride,
N-phenylglycinonitrile,
carboxymethyl N,N-dimethyldithiocarbamate and
tetrachloroterphthalic acid.

The presently preferred compounds for reducing or nullifying injury by the selective herbicide 4-chloro-2-butynyl N-(3-chlorophenyl)carbamate are 4'-chloro-2-hydroxyiminoacetanilide,
3',4'-dichloro-2-hydroxyiminoacetanilide,
N-methyl-2,5-dichlorobenzenesulfonamide,
2,4-dichloro-9-xanthenone,
5-(2,4-dichlorophenyl) hydantoin and
isopropylammonium N-isopropyldiethiocarbamate.

Many of the above antagonistic agents are known compounds and can be prepared by procedures described in the art. Other compounds can be prepared by analogous procedures. For example, isopropylammonium N-isopropyldithiocarbamte is prepared by the reaction of isopropylamine with carbon disulfide to give the crystalline product melting at 128–129° C. with decomposition. Furfurylammonium N-furfuryldithiocarbamate is prepared by the reaction of furfurylamine with carbon disulfide to give the crystalline product.

N-(3-chlorophenyl)tetrahydrophthalimide is obtained by the reaction of one mole of tetrahydrophthalic anhydride with one mole of 3-chloroaniline at an elevated temperature up to 135° C.

N-(3-chlorophenyl)pyruvamide was prepared by the reaction of 0.14 mole of 3,3'-dichlorophenylphosphazoanilide with 0.3 mole of pyruvic acid in toluene at 70° C. according to the method of Grimmel et al., J. Am. Chem. Soc., 68, 541 (1946). N-(3-chlorophenyl)tribromoacetamide was prepared by the reaction of 0.06 mole of 3,3'-dichlorophenylphosphazoanilide with 0.13 mole of tribromoacetic acid in toluene at about 90° C. N-(3-chlorophenyl) 4-amino-2-hydroxybenzamide was prepared by the reaction of 0.09 mole of 3,3'-dichlorophenylphosphazoanilide with 0.195 mole of 4-aminosalicylic acid in toluene at reflux temperature.

Also, N-(4-chlorophenyl) α-chloropropionamide, M.P. 106–108° C., was prepared by the reaction of one mole of 4,4'-dichlorophosphazoanilide with two moles of α-chloropropionic acid in toluene at reflux temperature.

5-(3,4-dichlorophenyl)hydantoin is prepared by the reaction of one mole of 3,4-dichlorobenzaldehyde, four moles of ammonium carbonate and two moles of potassium cyanide in 50% aqueous ethanol at about 57–62° C. as described by Thornton et al., United States Patent No. 2,891,069.

N,N' - bis(3,4-dichlorobenzylidene)-3,4-dichlorobenzylidenediamine, M.P. 98–100° C., (tri-m,p-dichlorohydrobenzamide), was prepared by the reaction of 3,4-dichlorobenzaldehyde with ammonium hydroxide in methanol according to the procedure of Wiebe et al., J. Am. Chem. Soc., 54, 3637 (1932).

2,4-dichloro-9-xanthenone, M.P. 155–157° C., was prepared by the reaction of one mole of 2-chlorobenzoic acid with one mole of 2,4-dichlorophenol in a methanolic solution of sodium methoxide, according to the procedure of Dhar, J. Chem. Soc., 117, 1068 (1920).

1,3-bis(3-chloro-4-methylphenyl)thiourea was prepared by the reaction of 0.4 mole of 3-chloro-4-methylaniline with 0.2 mole of carbon disulfide in methanol at reflux temperature. The product has a melting point of 173–175° C.

α-chloro-α-(2,4-dichlorophenyl)acetic acid was prepared by the chlorination of 2,4-dichloromandelonitrile with thionyl chloride and then hydrolysis of the nitrile with aqueous sodium hydroxide.

2-benzothiazolyl N - (3 - chlorophenyl)thiolcarbamate, M.P. 167–170° C., is prepared by the reaction of one mole of mercaptobenzothiazol with one mole of 3-chlorophenyl isocyanate and a catalytic amount of pyridine in benzene at reflux temperature. 3-bromopropyl N-(4-bromophenyl)carbamate, M.P. 67–69° C., is prepared by the reaction of one mole of 3-bromo-1-propanol with one mole of 4-bromophenyl isocyanate in the presence of a catalytic amount of pyridine at reflux temperature in benzene. 2-bromoethyl N-(4-bromophenyl)carbamate, M.P. 82–83° C., is prepared by the reaction of one mole of 2-bromoethanol with one mole of 4-bromophenyl isocyanate in the presence of a catalytic amount of pyridine at reflux temperature in benzene.

β-morpholino-p-propiophenone hydrochloride is prepared by the Mannich reaction of p-bromoacetophenone, formaldehyde and morpholine hydrochloride at reflux temperature in acidic ethanol. The product melts at 208–210° C.

Ethyl 3-(2,5-dichlorophenyl)carbazate may be prepared according to the method described by Epperly et al., United States Patent No. 2,920,994.

Carboxymethyl N,N-dimethyldithiocarbamate can be prepared by the reaction of chloroacetic acid with the sodium salt of N,N-dimethyldithiocarbamic acid.

In order to counteract injury by the selective herbicide, the crop seed need be treated with only a small amount of the antagonistic agent. For example, application rates of about 8 oz. to as low as about 0.05 oz. of active agent per bushel of seed may be used. The presently preferred application rate is in the range of about 0.1 to 4 oz. of agent per bushel. The seed is treated with an antagonistic agent by use of conventional seed treating apparatus well known to the art. The seed is throughly mixed with the antagonistic agent in the seed treating apparatus, thereby giving a seed which is coated with the agent.

Since only a very small amount of active antagonistic agent is required for the seed treatment, the compound preferably is formulated as a wettable powder or an emulsifiable concentrate which can be diluted with water by the seed treater for use in the seed treating apparatus. Of course, under certain conditions, it may be desirable to dissolve the antagonistic agent in an organic solvent for use as a seed treatment or the pure compound alone may be used under properly controlled conditions.

There are thus also provided by this invention novel seed treating compositions containing one or more of the described active antagonistic agents intimately dispersed in an inert carrier or diluent for the intended use. Such carriers may be either solids, such as talc, clay, diatomaceous earth, sawdust, calcium carbonate, and the like or liquids such as water, kerosene, acetone, benzene, toluene, xylene, and the like in which the active agent may be either dissolved or dispersed. Emulsifying agents are advisably used to achieve a suitable emulsion if two immiscible liquids are used as a carrier. Wetting agents may also be used to aid in dispersing the active antagonistic agent in liquids used as a carrier in which the agent is not completely soluble. Emulsifying agents and wetting agents, also known as "surface active agents," are sold under numerous tradenames and may be either pure compounds, mixtures of compounds of the same general groups, or they may be mixtures of compounds of different classes. Typical satisfactory surface active agents which may be used are alkali metal higher alkylarylsulfonates such as sodium dodecylbenzenesulfonate and the sodium salts of alkylnaphthalenesulfonic acids, fatty alcohol sulfates such as the sodium salts of monoesters of sulfuric acid with n-aliphatic alcohols containing 8–18 carbon atoms, long chain quaternary ammonium compounds, sodium salts of petroleum-derived alkylsulfonic acids, polyethylene sorbitan monooleate, alkylaryl polyether alcohols, water-soluble lignin sulfonate salts, alkali-casein compositions, long chain alcohols usually containing 10 to 18 carbon atoms, and condensation products of ethylene oxide with fatty acids, alkylphenols and mercaptans.

The following examples are presented to illustrate specific embodiments but are not intended to be construed as limiting the invention.

EXAMPLE 1

Selkirk wheat seed was treated with a large series of compounds which will produce formative effects on plants. The seed was treated at rates of 0.5, 1, 2 and 4 ounces of compound per bushel of seed by mixing the seed and compound together in a glass jar until the seed was uniformly coated. Four pots of wheat were planted with seed from each application rate. Wild oats seeds were planted in the same pot with the treated wheat seed. When the wild oats were in the 1½ leaf stage, one pot of plants from each concentration of the compound was sprayed with 4-chloro-2-butynyl N-(3-chlorophenyl)carbamate as a water emulsion at an injury producing rate (0.5–2 pounds per acre). Suitable untreated controls or controls treated with 4-chloro-2-butynyl N-(3-chlorophenyl)carbamate alone were included in each experiment as standards for measuring performance.

The pattern of toxicity and injury reduction was determined by measuring the plants one week after the carbamate herbicide was applied and again 3–4 weeks after the herbicide was applied. Low levels of the herbicide that inhibit normal leaf growth resulted in plants with shorter leaf blades than the controls one week after application. Strong antagonistic agents prevented this inhibition so the leaf growth was nearly the same as that of control plants that had not been treated with the herbicide. Higher levels of the herbicide inhibited both leaf and terminal growth. This inhibition resulted in plants that were much shorter than the untreated controls at both the one week and the 3–4 week measurement. Strong antagonistic agents prevented the leaf inhibition at the one week period and both strong and weak antagonistic agents prevented the terminal growth inhibition as was indicated by heights that were nearly the same as the untreated control plant heights after 3–4 weeks. The strong antagonistic agents also prevented the development of the blue-green color in the leaf blades.

The optimum rates found for reducing or nullifying injury are recorded in Table I.

Table I

| Antagonistic Agent | Optimum Rates (oz./bu.) for Reducing Injury | |
|---|---|---|
| | Leaf Injury | Growing Point Injury |
| N-(3-chlorophenyl)propionamide | 4 | 2 |
| 2-cyano-3-(2,4-dichlorophenyl)propenoic acid | 1 [2] | 1 [2] |
| 2,4,6-trichlorophenoxyacetic acid | N.S. | 2 |
| Piperidinium piperidine-1-carbothioate | 2 | 2 |
| Furfurylammonium N-furfuryldithiocarbamate | N.S. | 2 |
| Isobutylammonium N-isobutyldithiocarbamate | 0.5–4 | 0.5–4 |
| Isopropylammonium N-isopropyldithiocarbamate | 0.5 | 0.5–1 |
| N-(3-chlorophenyl)-1,2,3,6-tetrahydrophthalimide | 1 | 4 |
| N,N'-bis(3,4-dichlorobenzylidine)-3,4-dichlorobenzylidenediamine | 2 | 1 |
| N-(3-chlorophenyl)pyruvamide | 2 | 1 |
| 3'-chloro-2-hydroxyiminoacetanilide | 0.5–1 | 0.5 |
| 2,4-dichloro-9-xanthenone | 1–4 | 2 |
| 1,3-bis(3-chloro-4-methylphenyl)-thiourea | 1 | 1 |
| 4,7-dichloroisatin | 0.5 | 2 |
| N-(3-chlorophenyl)tribromoacetamide | N.S. | 2 |
| 6-chloroisatin-3-oxime | N.S. | 2 |
| 6-chloroisatin | 0.5 | 2 |
| α-chloro-α-(2,4-dichlorophenyl)-acetic acid | 0.5 | 1–2 |
| 2-benzothiazolyl N-(3-chlorophenyl)-thiolcarbamate | 2 | 0.5–2 |
| 7-chloroisatin | 0.5–2 | 0.5 |
| 5-chloroisatin-3-oxime | 0.5 | 0.5 |
| Cinnamohydroxamic acid | 4 | 2 |
| 5-(3,4-dichlorophenyl)hydantoin | 0.5–4 | 0.5 |
| 5-(2,4-dichlorophenyl)hydantoin | 0.5 | 0.5–4 |
| 5-(2-chlorophenyl)hydantoin | 1 | 1 |
| 5-(4-chlorophenyl)hydantoin | 1 | 2 |
| 4'-chloro-2-hydroxyiminoacetanilide | 0.5–1 | 0.5–1 |
| 3',4'-dichloro-2-hydroxyiminoacetanilide | 1 | 1 |
| 4,5-dichloroisatin | 2 | 2 |
| Ethyl naphthoate | 0.5–1 | 1 |
| n-Heptaldehyde | 1 | 1 |
| N-(3-chlorophenyl) 4-amino-2-hydroxybenzamide | 1 | 1–2 |
| 3-bromopropyl N-(4-bromophenyl)carbamate | N.S. | 1–4 |
| Phthalyl hydrazide | N.S. | 0.5 |
| Amalic acid | N.S. | 2 |
| Hydrocinnamic acid | 0.5 | 2 |
| 2-bromoethyl N-(4-bromophenyl)carbamate | N.S. | 0.5 |
| α-Hydrazoisobutyric acid | 1–2 | 2 |
| Dibenzoylmethane | N.S. | 4 |
| N-(4-chlorophenyl) α-chloropropionamide | N.S. | 0.5 |
| β-Morpholino-p-bromopropiophenone hydrochloride | N.S. | 2 |
| Ethyl 3-(2,5-dichlorophenyl)carbazate | 0.5 | 1 |
| α-(4-chlorophenyl)-α-methyl-2-pyridinemethanol hydrochloride | N.S. | 1 |

Table I—Continued

| Antagonistic Agent | Optimum Rates (oz./bu.) for Reducing Injury | |
|---|---|---|
| | Leaf Injury | Growing Point Injury |
| N-phenylglycinonitrile | 1 | |
| N-methyl-2,5-dichlorobenzene-sulfonamide | 2–4 | 2–4 |
| p-Toluenesulfonamide | 4 | 4 |
| Carboxymethyl N,N-dimethyldithio-carbamate | 2 | |
| Tetrachloroterephthalic acid | 4 | 1 |

[1] Only rate tested.

N.S. = injury reduction not significant at test rates.

EXAMPLE 2

Selkirk wheat seed was treated with a series of six antagonistic agents at rates of 0.5, 1, 2 and 4 ounces of agent per bushel of seed. The seed was treated by mixing the seed and the antagonistic agent together in a glass jar until the seed was uniformly coated.

Eight pots of wheat were planted with seed treated at each rate with each chemical. Sixteen pots of controls with no seed treatment were also planted. When the control plants were approximately 20 centimeters high, 4-chloro-2-butynyl N-(3-chlorophenyl)carbamate was sprayed as a water emulsion on the plants at a rate of 2 lbs./A. Half of the pots of control plants were not treated with the carbamate. The height of the plants in each pot was measured weekly, and the results recorded as the sum of eight replicates. Only healthy plant tissue was measured, since two weeks after treatment with the carbamate some were actually shorter than at the start of the test since the leaf tips had died back. The results are recorded in Table II.

Table II

| Antagonistic Agent | Seed Treatment Rate (oz./bu.) | Plant Height [1] (cm.) | | | | |
|---|---|---|---|---|---|---|
| | | Weeks after treatment with 4-chloro-2-butynyl N-(3-chlorophenyl)carbamate | | | | |
| | | 0 week | 1 week | 2 weeks | 3 weeks | 4 weeks |
| None (no carbamate treatment) | 0 | 165 | 272 | 280 | 324 | 428 |
| None (treated with carbamate at 2 lb./A.) | 0 | 165 | 171 | 150 | 183 | 269 |
| 4'-chloro-2-hydroxyiminoacetanilide | 0.5 | 142 | 169 | 203 | 292 | 423 |
| | 1 | 132 | 172 | 235 | 306 | 432 |
| | 2 | 127 | 147 | 183 | 232 | 351 |
| | 4 | 79 | 116 | 192 | 277 | 384 |
| 3',4'-dichloro-2-hydroxyiminoacetanilide | 0.5 | 142 | 160 | 170 | 253 | 369 |
| | 1 | 120 | 157 | 184 | 274 | 386 |
| | 2 | 108 | 140 | 171 | 260 | 385 |
| | 4 | 87 | 118 | 150 | 234 | 355 |
| N-methyl-2,5-dichlorobenzenesulfonamide | 0.5 | 160 | 173 | 168 | 238 | 366 |
| | 1 | 163 | 184 | 187 | 249 | 370 |
| | 2 | 151 | 177 | 206 | 281 | 395 |
| | 4 | 158 | 183 | 203 | 293 | 404 |
| 2,4-dichloro-9-xanthenone | 0.5 | 166 | 176 | 159 | 266 | 328 |
| | 1 | 156 | 176 | 158 | 199 | 309 |
| | 2 | 121 | 147 | 183 | 246 | 363 |
| | 4 | 122 | 156 | 190 | 267 | 394 |
| 5-(2,4-dichlorophenyl) hydantoin | 0.5 | 153 | 164 | 158 | 218 | 339 |
| | 1 | 159 | 174 | 154 | 198 | 304 |
| | 2 | 156 | 165 | 167 | 209 | 330 |
| | 4 | 165 | 184 | 188 | 246 | 381 |
| Isopropylammonium N-isopropyldithiocarbamate | 0.5 | 163 | 167 | 152 | 214 | 344 |
| | 1 | 159 | 162 | 160 | 218 | 343 |
| | 2 | 135 | 144 | 154 | 225 | 338 |
| | 4 | 114 | 124 | 143 | 226 | 333 |

[1] Sum of eight replicates.

The results show that plants from seed treated with the antagonistic agents prior to planting have a much more rapid and vigorous growth than plants from untreated seed. The antagonistic agents have counteracted the injury produced by the carbamate as evidenced by the increased height of plants from treated seed, especially two or more weeks after application of the selective herbicide.

EXAMPLE 3

Selkirk wheat seed was treated with a series of antagonistic agents at various rates by mixing the seed and the compound together in a glass jar until the seed was uniformly coated. The seed was then planted in pots of soil which had been treated with 2,3-dichloroallyl N-propylthiolcarbamate, a pre-emergent herbicide, at application rates of 1, 2 and 4 pounds per acre. Twenty-two days and again 55 days after planting, the height of the plants in each pot was measured. The results are presented in Table III.

Table III

| Antagonistic Agent | | 2,3-Dichloroallyl N-propylthiol-carbamate Application Rate | | | | | |
|---|---|---|---|---|---|---|---|
| | | 1 lb./A. | | 2 lb./A. | | 4 lb./A. | |
| Compound | Application Rate (oz./bu.) | Plant Height (cm.) after— | | Plant Height (cm.) after— | | Plant Height (cm.) after— | |
| | | 22 Days | 55 Days | 22 Days | 55 Days | 22 Days | 55 Days |
| Control | 0 | 18 | 34 | 2.7 | 7 | 0 | 0 |
| Isopropylammonium N-isopropyldithio-carbamate | 0.5 | 14 | 32 | 13 | 21 | 0 | 0 |
| | 1 | 16 | 36 | 12 | 16 | 0 | 0 |
| | 2 | 20 | 29 | 16 | 25 | 0 | 0 |
| N-(3-chlorophenyl)-1,2,3,6-tetrahydro-phthalimide | 1 | 23 | 36 | 7 | 9 | 0 | 0 |
| | 2 | 20 | 33 | 15 | 9 | 5 | 0 |
| 2,4-dichloro-9-xanthenone | 1 | 33 | 37 | 10 | 29 | 0 | 0 |
| | 2 | 28 | 23 | 19 | 18 | 0 | 7 |
| | 4 | 28 | 24 | 19 | 30 | 0 | 0 |
| Ethyl α,β-dibromo-cinnamate | 1 | 23 | 34 | 11 | 25 | 0 | 0 |
| 4'-chloro-2-hydroxy-iminoacetanilide | 1 | 20 | 30 | 12 | 27 | 7 | 0 |
| | 2 | 24 | 20 | 12 | 14 | 0 | 0 |
| | 4 | 20 | 35 | 17 | 28 | 5 | 0 |
| β-Morpholino-p-bromopropio-phenone·HCl | 2 | 12 | 33 | 7 | 25 | 0 | 0 |
| α-Hydrazoisobutyric acid | 1 | 17 | 24 | 6 | 21 | 0 | 0 |

EXAMPLE 4

Selkirk wheat seed was treated with 2,4,6-trichlorophenoxyacetic acid at 1, 2, 4 and 8 oz./bu. rate as described in the previous examples. The seed was planted in pots of soil which had been treated with 2,3-dichloroallyl N-propylthiolcarbamate at application rates of 1 and 2 pounds per acre. Eleven days after planting, the plant heights were measured. The results are presented in Table IV.

Table IV

| Antagonistic Agent | Application Rate (oz./bu.) | Plant Height [1] (cm.) at Herbicide Application Rates of— | |
|---|---|---|---|
| | | 1 lb./A. | 2 lb./A. |
| 2,4,6-trichlorophenoxyacetic acid | 1 | 33 | 17 |
| | 2 | 34 | 19 |
| | 4 | 32 | 20 |
| | 8 | 28 | 15 |
| Control | 0 | 28 | 13 |

[1] Sum of 4 replicates.

The antagonistic agents may also be used in the treatment of other crop seeds such as barley, oats, flax, sugar beets, safflower, sunflower, rapeseed, mustard, peas, and the like.

Of course, the seed may be coated with other compounds such as fungicides, insecticides, plant nutrients, etc., in addition to the antagonistic agent so long as the other coating materials do not interfere with the injury-reducing action of the antagonistic agent.

Other obvious changes and modifications of the invention can be made, and to the extent that such variations incorporate the spirit of this invention they are intended to be included within the scope of the appended claims.

I claim:
1. Seed, the plants grown from which are resistant to injury by a selective herbicide comprising crop seed coated with a non-phytotoxic quantity of a 2-hydroxyiminoacetanilide of the formula

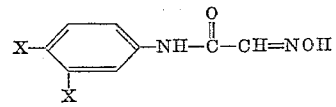

wherein X represents a member of the group consisting of chlorine and hydrogen, at least one of said X's being chlorine.

2. Seed, the plants grown from which are resistant to injury by a selective herbicide comprising crop seed coated with a non-phytotoxic quantity of an antagonistic agent for said selective herbicide.

3. Seed as claimed in claim 2, in which the antagonistic agent is 2,4-dichloro-9-xanthenone.

4. Seed as claimed in claim 2, in which the antagonistic agent is a hydantoin of the formula

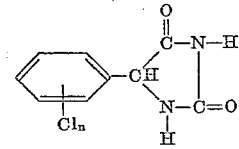

wherein $n$ represents an integer of less than three.

5. Seed as claimed in claim 2, in which the antagonistic agent is isopropylammonium N-isopropyldithiocarbamate.

6. Seed as claimed in claim 2, in which the antagonistic agent is N-methyl-2,5-dichloro-benzenesulfonamide.

7. The method of reducing injury to young crop plants occasioned by control of weeds in the planted crop by selective herbicides which comprises treating the seed of said crop plants prior to planting with a non-phytotoxic amount of a hormone-type growth regulant as a systemic antagonistic agent for said selective herbicide and applying said selective herbicide subsequent to planting.

8. The method of reducing injury to young crop plants occasioned by control of weeds in the planted crop by a selectively herbicidal carbamate which comprises treating the seed of said crop plants prior to planting with a non-phytotoxic amount of a hormone-type growth regulant as a systemic antagonistic agent for said selectively herbicidal carbamate and applying said carbamate subsequent to planting.

9. The method of claim 8 in which said crop seed is treated with said antagonistic agent at a rate of about 0.05 to 8 ounces per bushel.

10. The method of claim 8 in which said selective herbicidal carbamate is 2,3-dichloroallyl N-propylthiolcarbamate.

11. The method of reducing injury to young crop plants occasioned by control of weeds in the planted crop by 4-halo-2-butynyl N-(3-halophenyl) carbamate which comprises treating the seed of said crop plants prior to planting with a non-phytotoxic amount of a hormone-type growth regulant as a systemic antagonistic agent for said 4-halo-2-butynyl N-(3-halophenyl) carbamate and applying said 4-halo-2-butynyl N-(3-halophenyl) carbamate subsequent to planting.

12. The method of claim 11 in which said antagonistic agent is a halogenated 2-hydroxyiminoacetanilide.

13. The method of claim 11 in which said antagonistic agent is 2,4-dichloro-9-xanthenone.

14. The method of claim 11 in which said antagonistic agent is a hydantoin of the formula

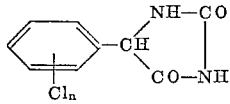

wherein $n$ represents an integer of less than three.

15. The method of claim 11 in which said antagonistic agent is isopropylammonium N-isopropyldithiocarbamate.

16. The method of claim 11 in which said antagonistic agent is N-methyl-2,5-dichlorobenzenesulfonamide.

References Cited in the file of this patent
UNITED STATES PATENTS 2,671,985    Vogelsang _____ Mar. 16, 1954
2,894,873    Seven _____ July 14, 1959

OTHER REFERENCES

Weaver, R. J.: Reaction of Certain Plant Growth Regulators With Ion Exchangers. In Science (magazine), 106 (2751): pages 268, 269, 270, Sept. 19, 1947, QI. S34.

Sadler, P. W., et al.: Synthesis and Absorption Spectra of the Symmetrical Chloroindigos. In Journal of the American Chemical Society, 78 (6): pp. 1251–1255, Mar. 20, 1956, QD1. A5.

Chemical Abstracts, vol. 52, columns 8443 and 8444, published 1958, article "Seed Treatment of Field Crops With Systemic Insecticides."